US007296491B2

(12) United States Patent
Noguchi

(10) Patent No.: US 7,296,491 B2
(45) Date of Patent: Nov. 20, 2007

(54) INJECTION MOLDED RESIN GEAR, INJECTION MOLDED RESIN ROTATING BODY, AND METHOD FOR PRODUCING THEM

(75) Inventor: Tadashi Noguchi, Saitama (JP)

(73) Assignee: Enplas Corporation, Saitama (JP)

( * ) Notice: Subject to any disclaimer, the term of this patent is extended or adjusted under 35 U.S.C. 154(b) by 808 days.

(21) Appl. No.: 10/838,888

(22) Filed: May 4, 2004

(65) Prior Publication Data

US 2004/0226396 A1 Nov. 18, 2004

(30) Foreign Application Priority Data

May 13, 2003 (JP) .......................... P2003-135017

(51) Int. Cl.
*F16H 57/00* (2006.01)

(52) U.S. Cl. ...................... 74/411; 74/443; 74/DIG. 10

(58) Field of Classification Search .......... 74/DIG. 10, 74/411, 443, 461

See application file for complete search history.

(56) References Cited

U.S. PATENT DOCUMENTS 7,004,046 B2 * 2/2006 Noguchi et al. .............. 74/443

2004/0241276 A1 * 12/2004 Miyasaka .................. 425/543

FOREIGN PATENT DOCUMENTS

JP 10-278124 10/1998

* cited by examiner

*Primary Examiner*—David M. Fenstermacher
(74) *Attorney, Agent, or Firm*—Bachman & LaPointe, P.C.

(57) ABSTRACT

An injection molded resin gear 1 includes an outside rim 6, an inside hub 4, a web 7 extending in radial directions to connect the rim 6 to the hub 4, and circumferential ribs 8 which are formed on both sides 9 and 9 of the web 7 between the hub 4 and the rim 6 so as to be concentric with the rim 6. A plurality of inside radial ribs 10 extending from the hub 4 to the circumferential ribs 8 are formed on the sides 9 and 9 of the web 7 between the hub 4 and the circumferential rib 8 so as to be arranged in regular intervals in circumferential directions. A plurality of outside radial ribs 11 extending from the circumferential ribs 8 to the rim 6 are formed on the sides 9 and 9 of the web 7 between the circumferential ribs 8 and the rim 6 in regular intervals to be displaced in circumferential directions with respect to the inside radial ribs 10 so as to be arranged between connecting portions at which the inside radial ribs 10 are connected to the circumferential rib 8. In the injection molded resin gear 1, injection molding gates 12 are arranged so as to be displaced in circumferential directions with respect to the inside radial ribs 10 and outside radial ribs 11.

4 Claims, 6 Drawing Sheets

INJECTION MOLDED RESIN GEAR, INJECTION MOLDED RESIN ROTATING BODY, AND METHOD FOR PRODUCING THEM

BACKGROUND OF THE INVENTION

1. Field of the Invention

The present invention relates to a resin gear forming a power transmission device for various machines, such as printers, copying machines, video tape recorders and automotive parts, and a method for producing the same. The present invention also relates to an injection molded resin rotating body, such as a resin gear, a resin pulley or a resin sprocket, and a method for producing the same.

2. Description of the Prior Art

Conventional power transmission devices for machines, such as copying machines and automotive parts, use resin gears in order to reduce the price, weight and operation noises of parts. Typically, such a resin gear is formed so as to have a predetermined shape by injection molding. The shape of the resin gear is devised so that the resin gear has a desired precision of tooth profile and a desired strength in accordance with intended purpose.

FIGS. 8 and 9 show such a conventional injection molded resin gear 21. In the injection molded resin gear 21 shown in these figures, in order to decrease the amount of shrinkage in a process for cooling and solidifying a resin after injection molding to improve the precision of gear, a rim 23 having teeth 22 on its outer periphery is connected to a hub 25, into which a driving shaft 24 is to be fitted, by means of a thin-plate-like web 26 in radial directions. However, in such an injection molded resin gear 21 having the thin web 26, the rigidity of the web 26 deteriorates, so that there are some cases where a twist between the rim 23 and the hub 25 is given by external force acting thereon during power transmission to deteriorate the precision of transmission of rotation.

Therefore, in the conventional injection molded resin gear 21, circumferential ribs 27 are formed on both sides of the web 26 between the hub 25 and the rim 23 to be connected to the hub 25 by radial ribs 28 and to rim 23 by radial ribs 30, so that the rigidity of the web 26 is enhanced by the plurality of circumferential ribs 27 and radial ribs 28 and 30 (see, e.g., Japanese Patent Laid-Open No. 10-278124).

In such a conventional injection molded resin gear 21, as shown in FIGS. 8 and 9, there are some cases where injection molding gates 31 are arranged on a side of the web 26 on extension lines La which extend in radial directions from the radial ribs 30. Since a resin material injected into a cavity (not shown) from the gates 31, which are arranged on the extension lines La extending in radial directions from the radial ribs 30, is easy to flow along a space for forming the radial ribs 30 in the cavity (not shown), the resin material is late in flowing into a space for forming the web 26 in the cavity, so that the flow velocity of the resin material is not uniform in radial directions.

In addition, if the radial ribs 28 are arranged at positions at which resin materials injected from adjacent two of the gates 31 meet each other, after the resin materials injected from the adjacent two of the gates 31 meet each other, the resin materials are easy to flow in a space for forming the radial ribs 28 in the cavity.

As a result, when the resin material injected from the gates 31 flows in the cavity, the time for the resin material to reach outside and inside radial ends varies in accordance with the circumferential positions. Thus, the flow of the resin material is not uniform, so that it is difficult to uniformly apply an appropriate molding pressure on the rim 23 having the teeth 22 and on the hub 25 into which the driving shaft 24 is to be fitted. In addition, the cooling rate of the resin material is not uniform, and the amount of shrinkage during cooling and solidification varies in accordance with the circumferential positions, so that it is difficult to improve the precision of gear.

In particular, in the injection molded resin gear 21 formed by injection-molding a resin including a reinforced fiber, such as carbon fiber, since the radial flow velocity of the resin material injected from the gates 31 varies in accordance with the circumferential positions as described above, the orientation of the reinforced fiber is disturbed to cause a great difference in shrinkage during cooling and solidification of the resin material, and to cause a different in cooling solidification rate of the resin material, so that there is a problem in that the roundness (the precision of gear) of the toothed portion formed on the rim 23 deteriorates.

SUMMARY OF THE INVENTION

It is therefore an object of the present invention to eliminate the aforementioned problems and to provide an injection molded resin gear having a higher precision of gear, an injection molded resin rotating body having a higher precision of shape, and a method for producing them.

In order to accomplish the aforementioned and other objects, according to one aspect of the present invention, an injection molded resin gear comprises: an outside rim; an inside hub; a web which extends in radial directions to connect the rim to the hub; a circumferential rib which is formed on a side of the web between the hub and the rim so as to be concentric with the rim; a plurality of first radial ribs which are formed on the side of the web between the hub and the circumferential rib so as to extend from the hub to the circumferential rib and which are arranged in regular intervals in circumferential directions; and a plurality of second radial ribs which are formed on the side of the web between the circumferential rib and the rim so as to extend from the circumferential rib to the rim and which are arranged in regular intervals to be displaced from the first radial ribs in circumferential directions so as to be positioned in circumferential directions between connecting portions at which adjacent two of the first radial ribs are connected to the circumferential rib, wherein a cut scar formed by separating an injection molding gate from the injection molded resin gear is displaced in circumferential directions with respect to the first and second radial ribs.

In this injection molded resin gear, a plurality of cut scars, which are formed by separating a plurality of injection molding gates from the injection molded resin gear and which include the cut scar, may be displaced in circumferential directions with respect to the first and second radial ribs, and each middle position in circumferential directions between adjacent two of the cut scars may be displaced in circumferential directions with respect to the first and second radial ribs.

According to another aspect of the present invention, there is provided a method for producing an injection molded resin gear which comprises: an outside rim; an inside hub; a web which extends in radial directions to connect the rim to the hub; a circumferential rib which is formed on a side of the web between the hub and the rim so as to be concentric with the rim; a plurality of first radial ribs which are formed on the side of the web between the hub and the circumferential rib so as to extend from the hub to the circumferential rib and which are arranged in regular intervals in circumferential directions; and a plurality of second radial ribs which are formed on the side of the web between the circumferential rib and the rim so as to extend from the circumferential rib to the rim and which are arranged in regular intervals to be displaced from the first radial ribs in circumferential directions so as to be positioned in circumferential directions between connecting portions at which adjacent two of the first radial ribs are connected to the circumferential rib, wherein an injection molding gate is arranged so as to be displaced in circumferential directions with respect to portions for forming the first and second radial ribs in a cavity.

In this method for producing an injection molded resin gear, a plurality of injection molding gates including the injection molding gate may be arranged so as to be displaced in circumferential directions with respect to the portions for forming the first and second radial ribs in the cavity, the plurality of injection molding gates being arranged so that each middle position in circumferential directions between adjacent two of the gates is displaced in circumferential directions with respect to the portions for forming the first and second radial ribs in the cavity.

According to a further aspect of the present invention, an injection molded resin rotating body comprises: an outside annular portion; an inside shaft supporting portion for supporting thereon a shaft; a plate portion which extends in radial directions to connect the shaft supporting portion to the annular portion; a circumferential rib which is formed on a side of the plate portion between the shaft supporting portion and the annular portion so as to be concentric with the annular portion; a plurality of first radial ribs which are formed on the side of the plate portion between the shaft supporting portion and the circumferential rib so as to extend from the shaft supporting portion to the circumferential rib and which are arranged in regular intervals in circumferential directions; and a plurality of second radial ribs which are formed on the side of the plate portion between the circumferential rib and the annular portion so as to extend from the circumferential rib to the annular portion and which are arranged in regular intervals to be displaced from the first radial ribs in circumferential directions so as to be positioned in circumferential directions between connecting portions at which adjacent two of the first radial ribs are connected to the circumferential rib, wherein a cut scar formed by separating an injection molding gate from the injection molded resin gear is displaced in circumferential directions with respect to the first and second radial ribs.

In this injection molded resin rotating body, a plurality of cut scars, which are formed by separating a plurality of injection molding gates from the injection molded resin gear and which include the cut scar, may be displaced in circumferential directions with respect to the first and second radial ribs, and each middle position in circumferential directions between adjacent two of the cut scars may be displaced in circumferential directions with respect to the first and second radial ribs.

According to a still further aspect of the present invention, there is provided a method for producing an injection molded resin rotating body which comprises: an outside annular portion; an inside shaft supporting portion for supporting thereon a shaft; a plate portion which extends in radial directions to connect the shaft supporting portion to the annular portion; a circumferential rib which is formed on a side of the plate portion between the shaft supporting portion and the annular portion so as to be concentric with the annular portion; a plurality of first radial ribs which are formed on the side of the plate portion between the shaft supporting portion and the circumferential rib so as to extend from the shaft supporting portion to the circumferential rib and which are arranged in regular intervals in circumferential directions; and a plurality of second radial ribs which are formed on the side of the plate portion between the circumferential rib and the annular portion so as to extend from the circumferential rib to the annular portion and which are arranged in regular intervals to be displaced from the first radial ribs in circumferential directions so as to be positioned in circumferential directions between connecting portions at which adjacent two of the first radial ribs are connected to the circumferential rib, wherein an injection molding gate is arranged so as to be displaced in circumferential directions with respect to portions for forming the first and second radial ribs in a cavity.

In this method for producing an injection molded resin rotating body, a plurality of injection molding gates including the injection molding gate may be arranged so as to be displaced in circumferential directions with respect to the portions for forming the first and second radial ribs in the cavity, the plurality of injection molding gates being arranged so that each middle position in circumferential directions between adjacent two of the gates is displaced in circumferential directions with respect to the portions for forming the first and second radial ribs in the cavity.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, the preferred embodiments of the present invention will be described below in detail.

First Preferred Embodiment

Figure 1:
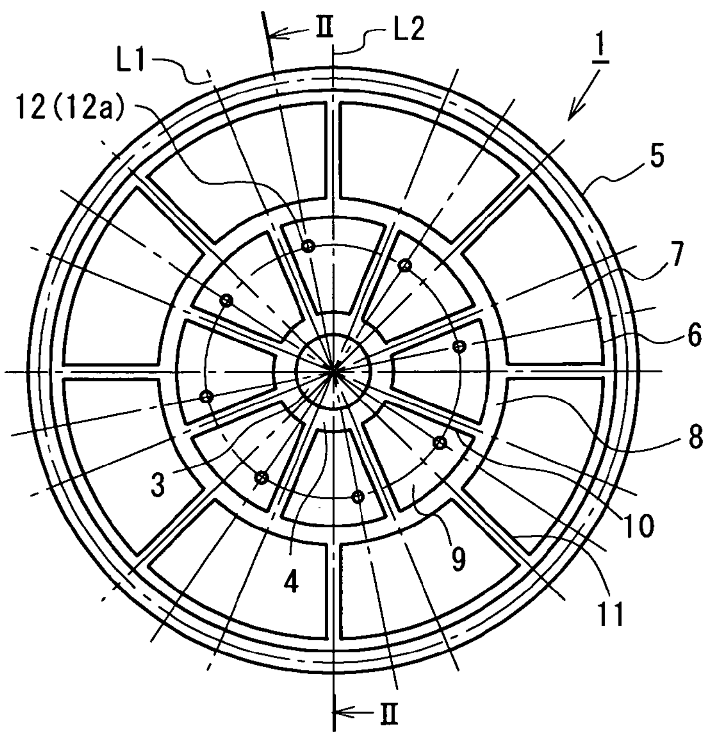
FIG. 1 is a front view of the first preferred embodiment of an injection molded resin gear according to the present invention.
Figure 2:
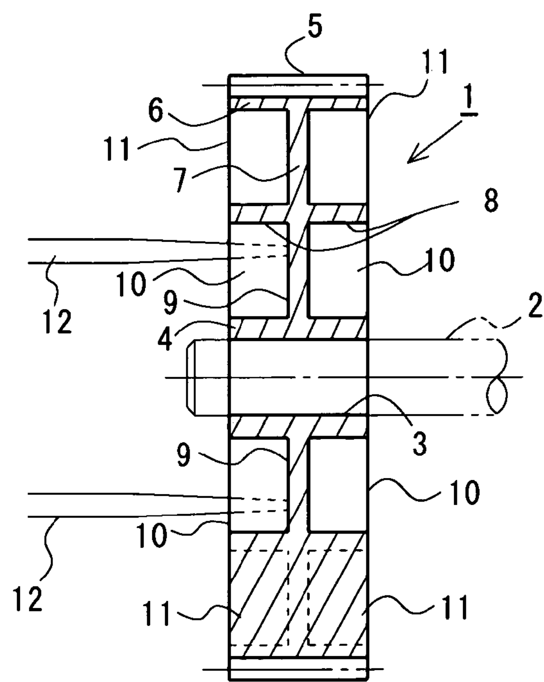
FIG. 2 is a sectional view of the injection molded resin gear taken along line II-II of FIG. 1.

FIGS. 1 and 2 show the first preferred embodiment of an injection molded resin gear (injection molded resin rotating body) 1 according to the present invention. FIG. 1 is a front view of the injection molded resin gear 1, and FIG. 2 is a sectional view of the injection molded resin gear 1 taken along line II-II of FIG. 1.

As shown in these figures, the injection molded resin gear 1 is formed by injection-molding a resin material, such as polyacetal or fluoridated carbonate, and comprises: a substantially cylindrical hub (shaft supporting portion) 4 having an axial hole 3 capable of receiving therein and engaging a driving shaft 2; a substantially cylindrical rim (annular portion) 6 having teeth 5 on the outer periphery thereof; and a web (plate portion) 7 which extends in radial directions to connect the hub 4, which is arranged inwardly in radial directions, to the rim 6 which is arranged outwardly in radial directions.

On both sides 9 and 9 of the web 7 of the injection molded resin gear 1, cylindrical circumferential ribs 8 are formed concentrically with the hub 4 so as to be symmetrical with respect to the web 7. The circumferential ribs 8 of the injection molded resin gear 1 are connected to the hub 4 thereof by inside radial ribs (first radial ribs) 10 which are arranged at regular intervals so as to extend in radial directions. The inside radial ribs 10 are formed on the sides 9 and 9 of the web 7 between the hub 4 and the circumferential ribs 8 to connect the hub 4 to the circumferential ribs 8 in radial directions. The circumferential ribs 8 are connected to the rim 6 by outside radial ribs (second radial ribs) 11 which are arranged at regular intervals so as to extend in radial directions. The outside radial ribs 11 are formed on the sides 9 and 9 of the web 7 between the circumferential ribs 8 and rim 6. The outside radial ribs 11 are displaced in circumferential directions from connecting portions, at which the inside radial ribs 10 are connected to the circumferential ribs 8, so as to be arranged at the middle position between adjacent two of the inside radial ribs 10, to connect the circumferential ribs 8 to the rim 6 in radial directions.

On one of the sides 9 of the web 7 surrounded by the hub 4, one of the circumferential ribs 8 and adjacent two of the inside radial ribs 10, injection molding gates 12 are arranged so as to be displaced in circumferential directions with respect to the inside radial ribs 10 and outside radial ribs 11. Furthermore, in this preferred embodiment, each of the injection molding gates 12 is arranged at the middle position in circumferential directions between one of the inside radial ribs 10 and a corresponding one of the outside radial ribs 11.

In addition, the injection molding gates 12 are arranged so that the middle position in circumferential directions between adjacent two of the gates 12 is not positioned on extension lines L1, which extend in radial directions from the inside radial ribs 10, and on extension lines L2 which extend in radial directions from the outside radial ribs 11. The gates 12 are arranged at positions in radial directions so that a pressure during injection molding effectively acts on the side of the rim 6 to improve the precision of shape of the teeth 5. In this preferred embodiment, the positions of the gates 12 in radial directions are nearer to the circumferential ribs 8 than the hub 4.

As described above, in the injection molded resin gear 1 in this preferred embodiment, the gates 12 are not positioned on the inside radial ribs 10 and the extension lines L1 which extend in radial directions from the inside radial ribs 10, and the gates 12 are not positioned on the outside radial ribs 11 and the extension lines L2 which extend in radial directions from the outside radial ribs 11. Therefore, as shown in FIG. 3, the resin material injected from the gates 12 into a cavity 14 of a die 13 first flows in a portion 7*a* in the cavity 14, which corresponds to the web 7, without being first filled in portions 10*a* in the cavity 14, which correspond to the inside radial ribs 10, and in portions 11*a* in the cavity 14, which correspond to the outside radial ribs 11, so that the filling rate in radial directions in the cavity 14 is uniform.

As a result, according to this preferred embodiment, the cooling solidification rate of the injection molded resin gear 1 after injection molding is uniform, so that it is possible to decrease the difference in shrinkage between portions of the injection molded resin gear 1 to improve the precision of gear (roundness and precision of tooth profile). In particular, if the injection molded resin gear 1 in this preferred embodiment is formed by injection-molding a resin containing a reinforced fiber, such as carbon fiber, it is difficult to disturb the orientation of the reinforced fiber of the resin material, so that it is possible to remarkably decrease the difference in shrinkage between portions due to the disturbance of the orientation of the reinforced fiber. Thus, it is possible to more effectively improve the precision of gear.

Figure 3:
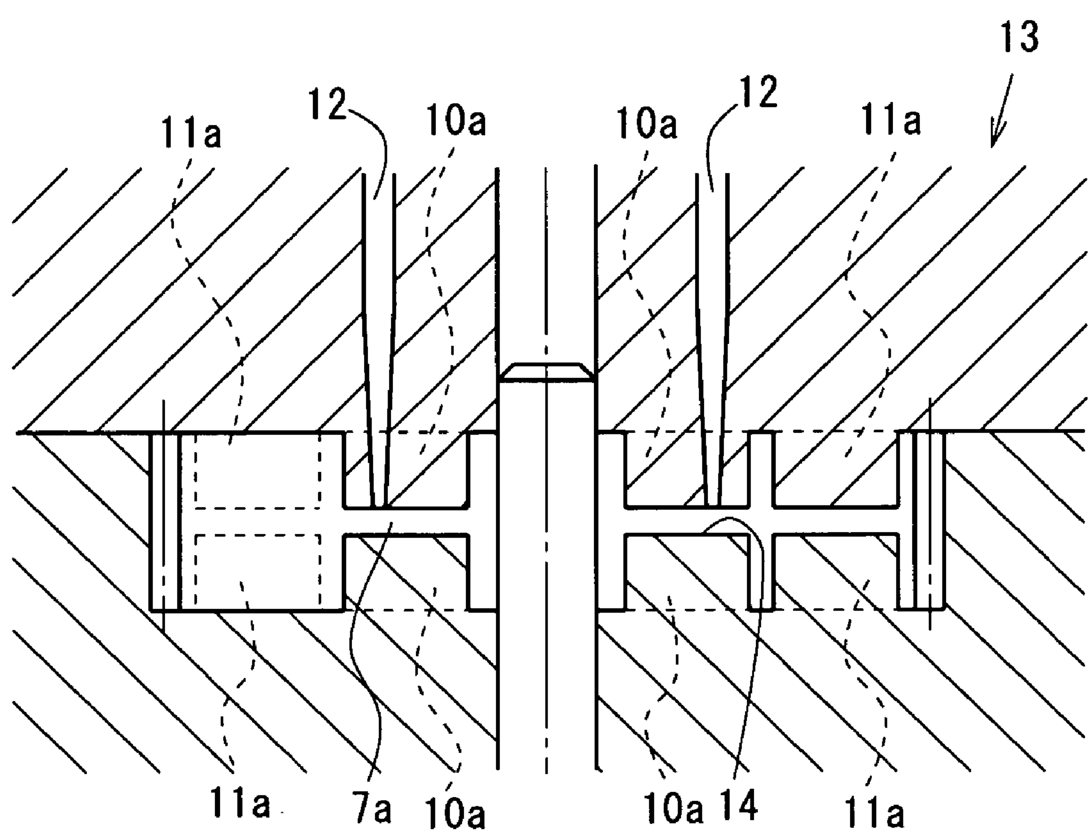
FIG. 3 is a sectional view of a part of a die, which schematically shows a cavity for the first preferred embodiment of an injection molded resin gear according to the present invention, for simply explaining a method for producing the injection molded resin gear.

As shown in FIG. 3, the injection molded resin gear 1 having been cooled and solidified in the cavity 14 is separated from the injection molding gates 12 when being taken out of the cavity 14, so that cut scars 12*a* formed by separating the gates 12 from the gear remain at positions corresponding to the injection molding gates 12 (see FIG. 1). However, the cut scars 12*a* formed by separating the gates 12 from the gear do not influence the precision of gear and do not disturb power transmission.

Furthermore, if the gates 12 are arranged at positions corresponding to the inside radial ribs 10 and/or outside radial ribs 11, or if the gates 12 are arranged on the extension lines L1 extending in radial directions from the inside radial ribs 10 and/or on the extension lines L2 extending in radial directions from the outside radial ribs 11, after the resin material injected from the gates 12 into the cavity 14 first flows in the portions 10*a* corresponding to the inside radial ribs 10 and in the portions 11*a* corresponding to the outside radial ribs 11, the resin material flows in the portion 7*a* corresponding to the web 7. Thus, the cooling solidification rate is not only ununiform after injection molding, but it is also difficult to adequately hold a pressure on the side of the rim 6, which is required to hold the precision of molding of the teeth 5, and a pressure on the side of the hub 4 into which the driving shaft 2 is to be fitted, so that it is difficult to improve the precision of gear.

In the injection molded resin gear 1 in this preferred embodiment, the middle position in circumferential directions between adjacent two of the gates 12 is displaced from the extension lines L1 extending in radial directions from the inside radial ribs 10, and from the extension lines L2 extending in radial directions from the outside radial ribs 11. As a result, after the resin materials injected from adjacent two of the gates 12 into the cavity 14 meet each other at the middle position in circumferential directions between the adjacent two of the gears 12, the resin materials do not flow in the portions 10a corresponding to the inside radial ribs 10 and in the portions 11a corresponding to the outside radial ribs 11, prior to the portion 7a corresponding to the web 7 (see FIG. 3). Thus, it is possible to more effectively improve the precision of gear in cooperation with the advantageous effects obtained by the fact that the gates 12 are not positioned on the extension lines L1 extending in radial directions from the inside radial ribs 10 and on the extension lines L2 extending in radial directions from the outside radial ribs 11.

Second Preferred Embodiment

Figure 4:
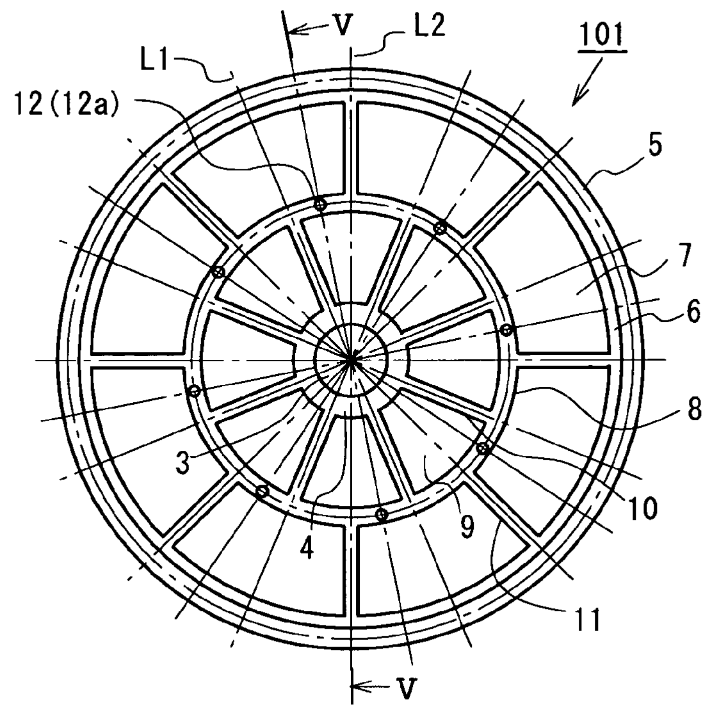
FIG. 4 is a front view of the second preferred embodiment of an injection molded resin gear according to the present invention.
Figure 5:
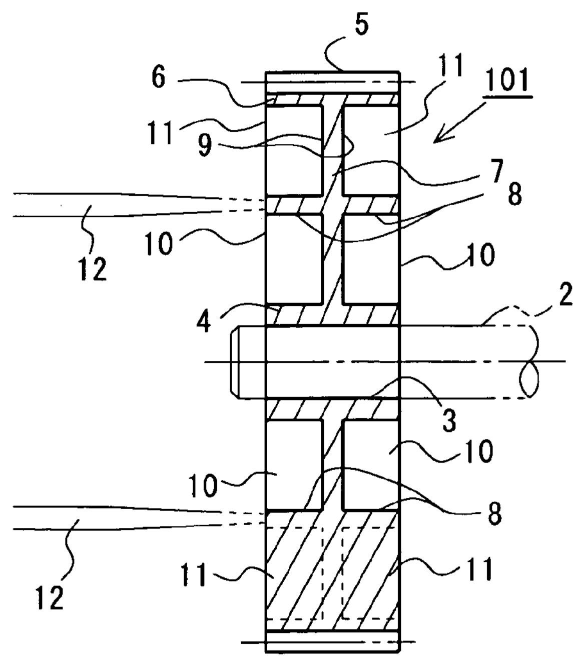
FIG. 5 is a sectional view of the injection molded resin gear taken along line V-V of FIG. 4.

FIGS. 4 and 5 show the second preferred embodiment of an injection molded resin gear 101 according to the present invention. FIG. 4 is a front view of the injection molded resin gear 101 in this preferred embodiment, and FIG. 5 is a sectional view of the injection molded resin gear 101 taken along line V-V of FIG. 4. In this preferred embodiment, the same reference numbers as those in the above described first preferred embodiment are given to the same portions as those in the first preferred embodiment to omit repeated explanation.

As shown in these figures, in the injection molded resin gear 1 in this preferred embodiment, a plurality of injection molding gates 12 are arranged in regular intervals on a circumferential rib 8. The injection molding gates 12 are arranged at the middle position between a connecting portion, at which each of inside radial ribs 10 is connected to the circumferential rib 8, and a connecting portion at which a corresponding one of outside radial ribs 11 is connected to the circumferential rib 8. In addition, the gates 12 are arranged on the circumferential rib 8 so that the middle position in circumferential direction between adjacent two of the gates 12 is not positioned on extension lines L1 and L2 extending in radial directions from the inside radial ribs 10 and outside radial ribs 11.

According to this preferred embodiment with such a construction, after resin materials injected from the gates 12 flow along the circumferential rib 8, the resin materials substantially uniformly flow in radial directions from the circumferential rib 8, so that the circumferential rib 8 functions as a ring gate. Therefore, according to this preferred embodiment with such a construction, the flow of the resin materials injected from the gates 12 is uniform, and the cooling solidification rate after injection molding is uniform, so that it is possible to inhibit the occurrence of a difference in shrinkage between portions to further improve the precision of gear in cooperation with the advantageous effects obtained by the same portions as those in the above described first preferred embodiment.

Third Preferred Embodiment

Figure 6:
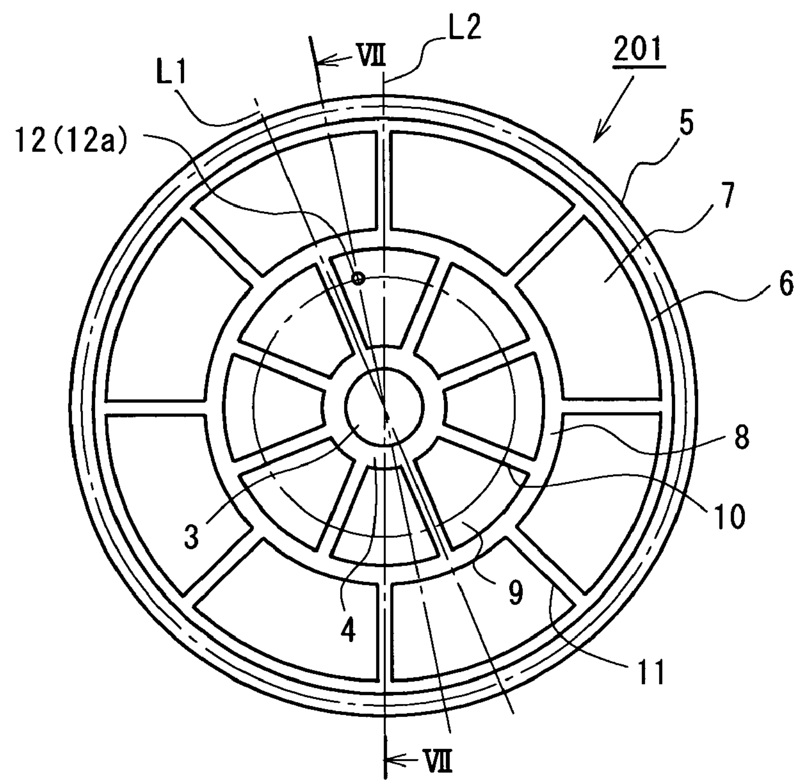
FIG. 6 is a front view of the third preferred embodiment of an injection molded resin gear according to the present invention.
Figure 7:
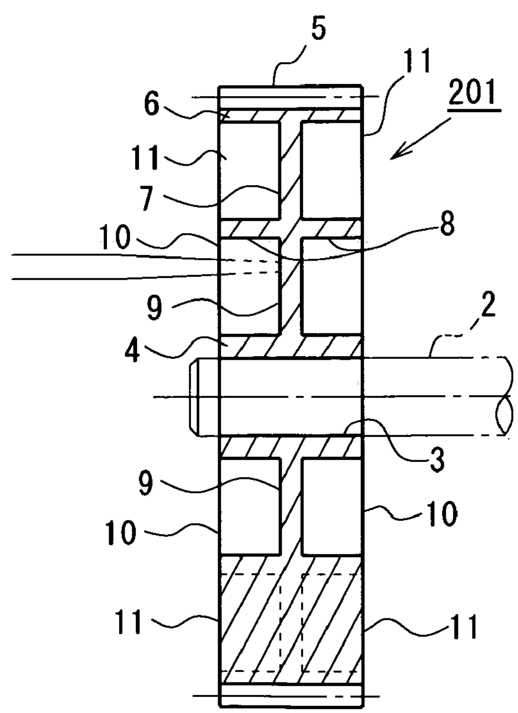
FIG. 7 is a sectional view of the injection molded gear taken along line VII-VII of FIG. 6.
Figure 8:
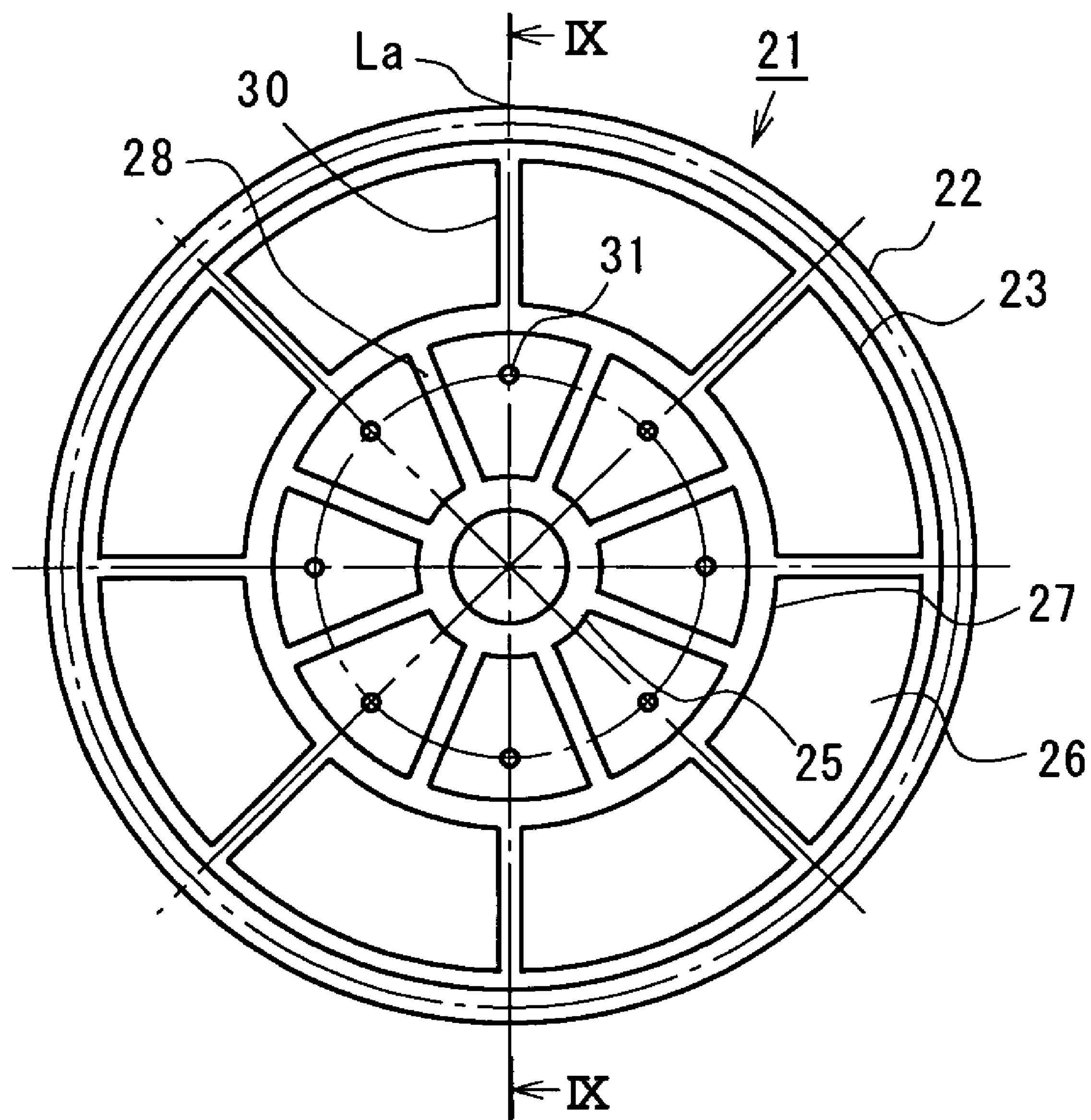
FIG. 8 is a front view of a conventional injection molded resin gear.
Figure 9:
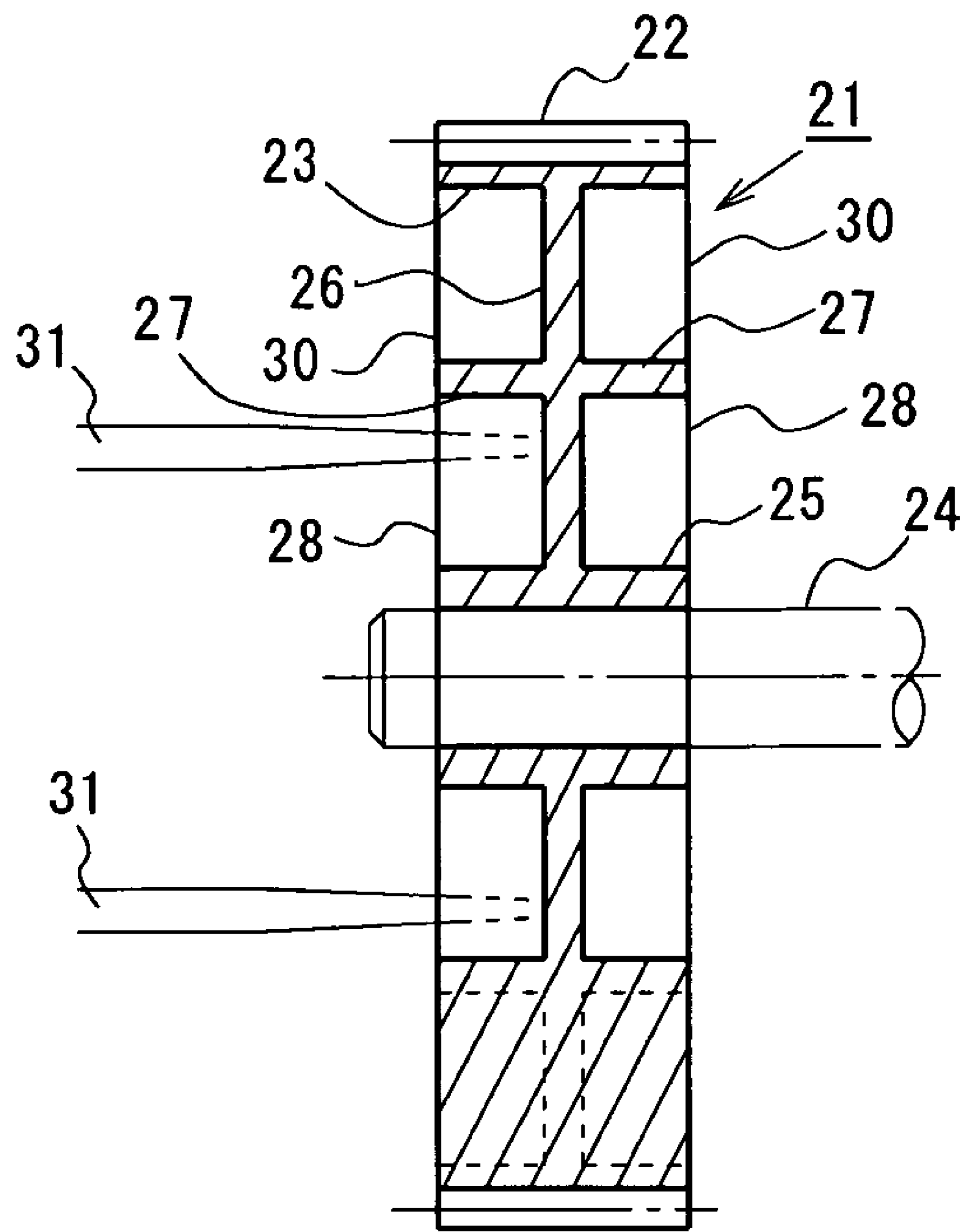
FIG. 9 is a sectional view of the conventional injection molded resin gear taken along line IX-IX of FIG. 8.

FIGS. 6 and 7 show the third preferred embodiment of an injection molded resin gear 201 according to the present invention. FIG. 6 is a front view of the injection molded resin gear 201 in this preferred embodiment, and FIG. 7 is a sectional view taken along line VII-VII of FIG. 6. In this preferred embodiment, the same reference numbers as those in the above described first preferred embodiment are given to the same portions as those in the first preferred embodiment to omit repeated explanation.

In the injection molded resin gear 201 in this preferred embodiment shown in FIGS. 6 and 7, only one injection molding gate 12 is arranged. In this preferred embodiment, the injection molding rate 12 is arranged at a position on one side 9 of a web 7 surrounded by a hub 4, a circumferential rib 8 and adjacent two of inside radial ribs 10 so as to be displaced in circumferential directions with respect to the inside radial ribs 10 and outside radial ribs 11. In addition, the injection molding gate 12 is arranged so that the inside radial ribs 10 and outside radial ribs 11 are not positioned on an extension line extending in radial directions from the injection molding gate 12. Thus, the inside radial ribs 10 and the outside radial ribs 11 are not arranged at positions at which resin materials injected from the injection molding gate 12 meet each other in circumferential directions.

According to this preferred embodiment with such a construction, the resin material injected from the injection molding gate 12 into a cavity 14 does not first flow in portions 10a corresponding to the inside radial ribs 10 and/or in portions 11a corresponding to the outside radial ribs 11, prior to a portion 7a corresponding to the web 7. Thus, the flow velocity of the resin material in radial directions is uniform, and the cooling solidification rate after injection molding is uniform, so that it is possible to improve the precision of gear.

Other Preferred Embodiments

The present invention should not be limited to the above described injection molded resin gears 1, 101 and 201 in the first through third preferred embodiments, but the invention may be widely applied to an injection molded resin rotating body, such as an injection molded resin pulley, an injection molded resin sprocket or an injection molded resin roller. That is, the present invention may be widely applied to an injection molded resin rotating body which comprises an outside annular portion onto which a belt or chain is to be wound, a shaft supporting portion for engaging a shaft, and a plate portion which connects the annular portion to the shaft supporting portion in radial directions. The present invention may be also applied to an injection molded resin roller which is used for conveying an object to be conveyed, the roller comprising an outside annular body for contacting the object, a shaft supporting portion for engaging a shaft, and a plate portion which connects the annular body to the shaft supporting portion.

The present invention may be applied to an injection molded resin gear wherein a web is arranged on the side of one end of a rim in width directions.

According to the present invention, the position of the gate 12 in radial directions is determined in accordance with a position at which a pressure during injection molding can be effectively applied. Thus, the present invention should not be limited to the above described first preferred embodiment wherein the gates 12 are arranged inside of the circumferential rib 8 in radial directions, but the gates 12 may be arranged outside of the circumferential rib 8 in radial directions.

According to the present invention, since gates are not positioned on inside radial ribs and their extension lines and on outside radial ribs and their extension lines, a resin material injected from the gates is not guided to portions in a cavity corresponding to the inside radial ribs and outside radial ribs so as to first flow therein prior to other portions, so that the flow velocity of the resin material injected from the gates is uniform. As a result, according to the present invention, the cooling solidification rate of the injection molded resin gear after injection molding can be uniform to decrease the difference in shrinkage between portions of the injection molded resin gear, so that it is possible to improve the precision of gear (roundness and precision of tooth profile).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An injection molded resin gear comprising:

an outside rim;

an inside hub;

a web which extends in radial directions to connect the rim to the hub;

a circumferential rib which is formed on a side of the web between the hub and the rim so as to be concentric with the rim;

a plurality of first radial ribs which are formed on the side of the web between the hub and the circumferential rib so as to extend from the hub to the circumferential rib and which are arranged in regular intervals in circumferential directions; and a plurality of second radial ribs which are formed on the side of the web between the circumferential rib and the rim so as to extend from the circumferential rib to the rim and which are arranged in regular intervals to be displaced from the first radial ribs in circumferential directions so as to be positioned in circumferential directions between connecting portions at which adjacent two of the first radial ribs are connected to the circumferential rib, wherein a cut scar formed by separating an injection molding gate from the injection molded resin gear is displaced in circumferential directions with respect to the first and second radial ribs.

2. An injection molded resin gear as set forth in claim 1, wherein a plurality of cut scars, which are formed by separating a plurality of injection molding gates from the injection molded resin gear and which include said cut scar, are displaced in circumferential directions with respect to said first and second radial ribs, and each middle position in circumferential directions between adjacent two of said cut scars is displaced in circumferential directions with respect to said first and second radial ribs.

3. An injection molded resin rotating body comprising:

an outside annular portion;

an inside shaft supporting portion for supporting thereon a shaft;

a plate portion which extends in radial directions to connect the shaft supporting portion to the annular portion;

a circumferential rib which is formed on a side of the plate portion between the shaft supporting portion and the annular portion so as to be concentric with the annular portion;

a plurality of first radial ribs which are formed on the side of the plate portion between the shaft supporting portion and the circumferential rib so as to extend from the shaft supporting portion to the circumferential rib and which are arranged in regular intervals in circumferential directions; and a plurality of second radial ribs which are formed on the side of the plate portion between the circumferential rib and the annular portion so as to extend from the circumferential rib to the annular portion and which are arranged in regular intervals to be displaced from the first radial ribs in circumferential directions so as to be positioned in circumferential directions between connecting portions at which adjacent two of the first radial ribs are connected to the circumferential rib, wherein a cut scar formed by separating an injection molding gate from the injection molded resin gear is displaced in circumferential directions with respect to the first and second radial ribs.

4. An injection molded resin rotating body as set forth in claim 3, wherein a plurality of cut scars, which are formed by separating a plurality of injection molding gates from the injection molded resin gear and which include said cut scar, are displaced in circumferential directions with respect to said first and second radial ribs, and each middle position in circumferential directions between adjacent two of said cut scars is displaced in circumferential directions with respect to said first and second radial ribs.

* * * * *